(No Model.) 2 Sheets—Sheet 2.
A. H. CLARK.
PISTON ROD PACKING.
No. 517,563. Patented Apr. 3, 1894.
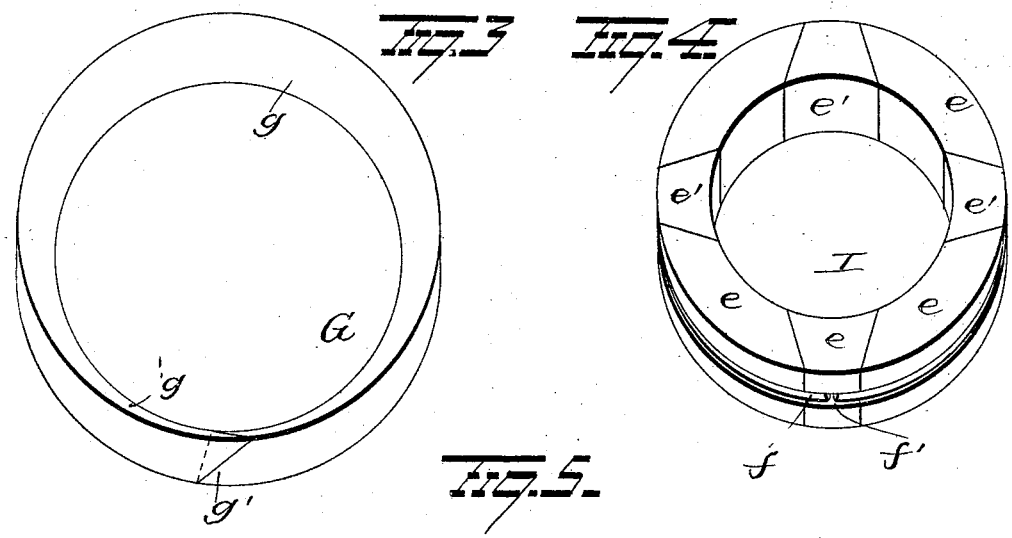
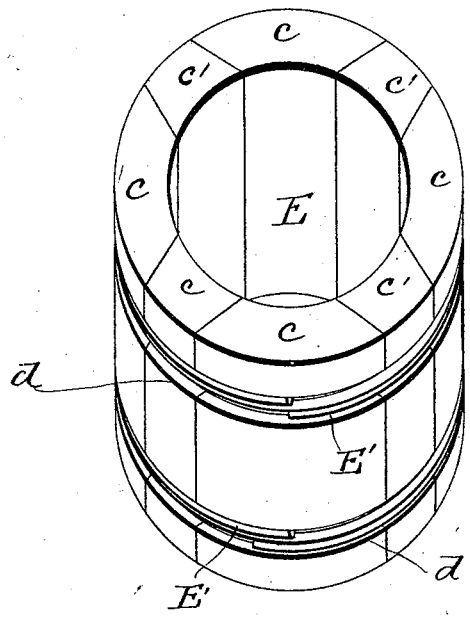
Witnesses
E. L. Nottingham
G. F. Downing.
Inventor
A. H. Clark
By H. A. Seymour
Attorney
THE NATIONAL LITHOGRAPHING COMPANY,
WASHINGTON, D. C.

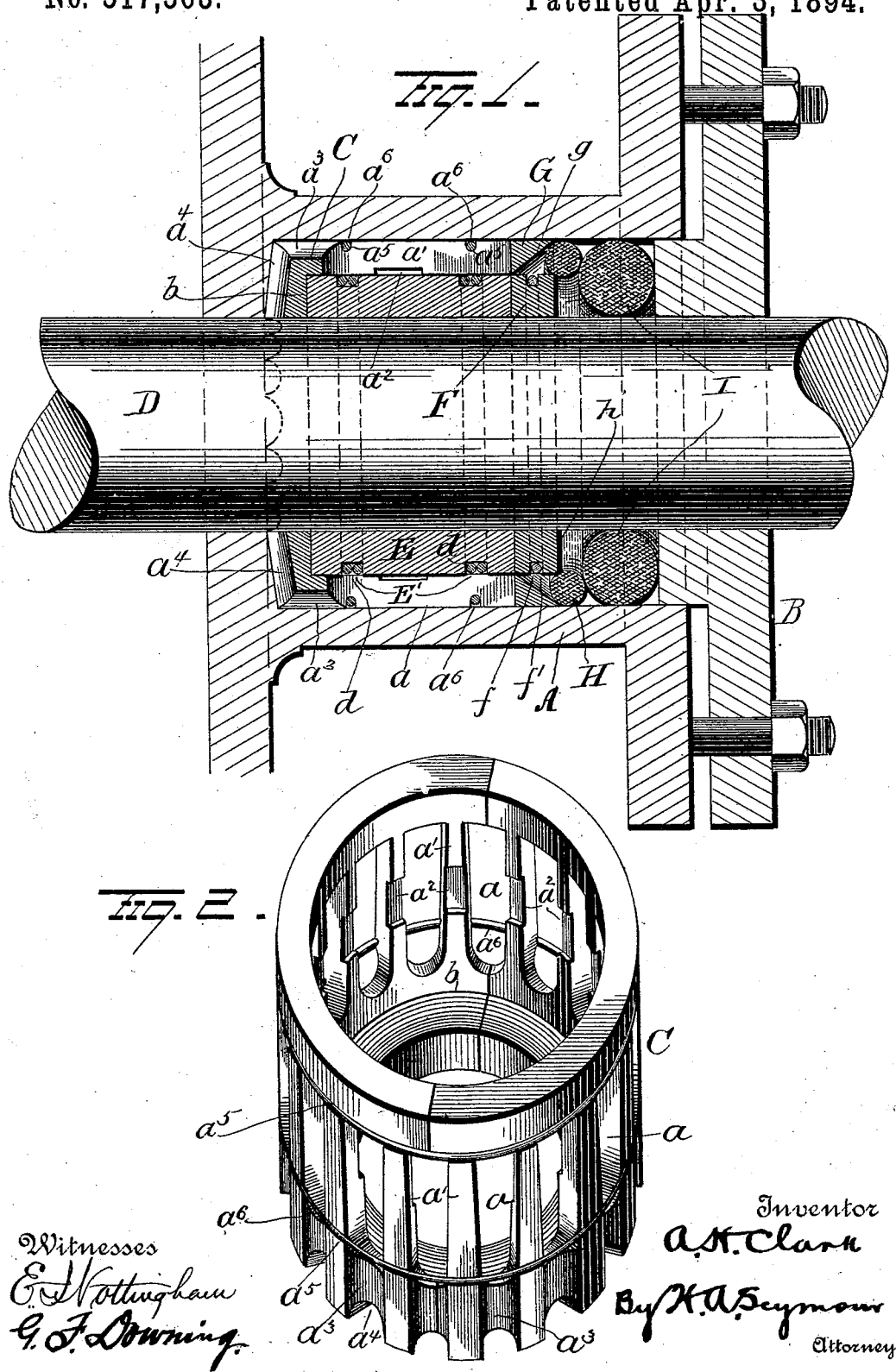

UNITED STATES PATENT OFFICE.

ALEXANDER H. CLARK, OF FOND DU LAC, WISCONSIN, ASSIGNOR OF ONE-HALF TO ISABELLA E. CLARK, OF DENVER, COLORADO.

PISTON-ROD PACKING.

SPECIFICATION forming part of Letters Patent No. 517,563, dated April 3, 1894.

Application filed April 1, 1893. Serial No. 468,651. (No model.)

*To all whom it may concern:*

Be it known that I, ALEXANDER H. CLARK, a resident of Fond du Lac, in the county of Fond du Lac and State of Wisconsin, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in piston rod packing,—its object being to construct a piston rod packing in such manner that the packing rings will be made to snugly embrace the piston rod at all times,—so that any steam or water which may find its way into the packing will be utilized to assist in maintaining the packing rings snugly against the rod and so that any steam or water finding its way into the packing will be prevented from following the piston rod through the packing.

With these objects in view the invention consists in certain novel features of construction and combinations and arrangements of parts as hereinafter set forth and pointed out in the claims.

In the accompanying drawings: Figure 1 is a sectional view illustrating my improvements. Fig. 2 is a separate view of the cage. Figs. 3, 4 and 5 are detail views.

A represents a stuffing box in which my improved packing is located and B the gland.

In constructing my improved packing I employ a cage C, preferably made in separable parts to facilitate its insertion into the stuffing box,—said cage being made with a number of slots or opening $a$ throughout its circumference, the posts $a'$ constituting the walls of said slots or openings being provided in their inner faces with recesses $a^2$. The inner end of each slot or opening $a$ communicates with a recess $a^3$ made in the periphery of the rear end or base of the cage, and the recesses $a^3$ communicate with recesses $a^4$ made in the rear face of said base. From this construction and arrangement of parts it will be seen that any steam or water which may be carried into the packing by the movement of the piston rod D passing through it, will enter the recesses $a^4$, from which it will pass through the recesses $a^3$ into the slots or openings $a$ and be brought to bear against packing rings located within the cage, thus assisting in maintaining said packing rings snugly against the piston rod D. The cage C is provided in proximity to its ends with grooves $a^5$ for the reception of wires $a^6$, whereby to bind the parts of the cage together. The base or rear end of the cage C is made with an inwardly projecting annular flange $b$, against which a packing ring E is adapted to abut, said packing ring preferably being of a length sufficient to extend to the opposite end of the case. The packing ring E is made of soft metal, and is composed, preferably, of two series of segments $c$, $c'$. The larger segments $c$, at their ends, are beveled inwardly, and the ends of the interposed smaller segments $c'$ are beveled outwardly and adapted to lie parallel with and abut against the beveled faces at the ends of the larger segments $c$. Or, if desired, the converse of this arrangement may be employed. The outer faces of the segments composing the ring E are made with grooves $d$ for the reception of springs E' which encircle the ring,—the action of said springs being to maintain the segments of the ring snugly against the piston rod, assisted by the steam or water which may find its way into the packing, as above explained.

By constructing the packing ring E as above described, it will always fit the piston rod snugly, regardless of the amount to which it may wear away. A narrow segmental packing ring F is located on the piston rod and adapted to bear against the forward end of the packing ring E, beyond the cage C, said packing ring F being composed of metallic segments $e$, $e'$, cut the same as the segments of the packing ring E and maintained snugly against the piston rod by a spring $f$ in a groove $f'$ in the outer face of the ring.

A ring G, preferably made of soft metal, is made to rest against the forward end of the cage C and provided with an inner inclined or beveled face $g$, said ring being made of a single piece and having its abutting ends $g'$, beveled. A flexible packing ring H is made to enter the space $h$ between the rings F and G. When pressure is applied to the packing ring H, the latter serves a two-fold purpose, viz., it forces the beveled ring G outwardly against the wall of the stuffing box, thus preventing steam or water which may enter the box, from passing between it and the wall of the stuffing box, and, bearing against the inclined or beveled face *g* of the ring G and the sectional ring F, said flexible packing ring H, serves to assist in forcing the sectional packing ring F, snugly against the piston rod. The rings G and H also serve to prevent any steam or water which may enter the cage C, from passing completely through the packing. A larger flexible packing ring I is placed against the flexible packing ring H, and against said larger packing ring, the gland B bears, the pressure exerted by said gland being transmitted through the larger packing ring I to the packing ring H, thus forcing the latter in the space between the rings F and G. As the large metallic, segmental packing ring E is being continuously pressed against the piston rod by the combined action of the springs which encircle it and the steam or water which may enter the cage C, no steam or water will be permitted to follow the piston rod through the packing.

My improvements are very simple in construction and are, in every respect effectual in the performance of their functions.

Having fully described my invention, what I claim as new, and desire to secure by Letters Patent is—

1. In a piston rod packing, the combination with an open cage, of a segmental, metallic packing ring inserted in said cage said segments each extending from end to end thereof, substantially as set forth.

2. In a piston rod packing, the combination with an open cage, of a segmental, metallic packing ring inserted in said cage said segments each extending from end to end thereof, and springs encircling said metallic, segmental packing ring, substantially as set forth.

3. In a piston rod packing, the combination with a cage having a number of slots or openings adapted to receive steam or water which may enter the packing, the posts dividing said slots or openings, being provided with recesses on their inner faces, of a segmental packing ring, located within said cage, substantially as set forth.

4. In a piston rod packing, the combination with an open cage made in separable parts, of a segmental, metallic packing ring located within said cage said segments each extending from end to end thereof, substantially as set forth.

5. In a piston rod packing, the combination with a cage, and a segmental packing ring located within said cage and extending from end to end thereof, of a narrow segmental packing ring adapted to bear against the first-mentioned packing ring, beyond the cage and a spring encircling said narrow segmental packing ring, substantially as set forth.

6. In a piston rod packing, the combination with a sectional packing ring, and an outer ring having an inclining or beveled upper face, of a flexible ring adapted to be inserted in the space between the sectional packing and the ring with the bevel or inclined upper face whereby to force the latter outwardly against the inner wall of the stuffing box and the sectional packing ring inwardly against the piston rod, substantially as set forth.

7. In a piston rod packing, the combination with a cage and a packing ring located therein and extending from end to end thereof, of a narrow metallic, sectional packing ring adapted to bear against the packing ring in the cage, a metallic packing ring having abutting ends and an inclined or beveled inner face, adapted to bear against the end of the cage, and a flexible packing ring inserted in the space between the narrow sectional, metallic packing ring and the beveled packing ring, and adapted to force the former against the piston rod and the latter against the inner wall of the stuffing box, substantially as set forth.

8. In a piston rod packing, the combination with a cage and a packing ring located therein and extending from end to end thereof, of a narrow, metallic, sectional packing ring adapted to bear against the packing ring in the cage, a metallic packing ring having abutting ends and an inclined or beveled inclined inner face and adapted to bear against the end of the cage, a flexible packing ring inserted in the space between the beveled packing ring and the narrow segmental packing ring, and a larger flexible packing ring, adapted to bear against the first-mentioned flexible packing ring, substantially as set forth.

9. The combination with a metallic cage, and a segmental packing ring lining the entire interior of the cage, of a packing ring bearing against one end of the cage, said ring provided with a beveled or inwardly inclined upper face, a segmental packing ring within the beveled ring and adapted to bear upon the piston rod, textile ring inserted in the space formed between this beveled face and the sectional ring, and a textile ring inserted between the first mentioned textile ring and the gland, substantially as set forth.

In testimony whereof I have signed this specification in the presence of two subscribing witnesses.

ALEXANDER H. CLARK.

Witnesses:
SILAS B. STILES,
S. J. DE RANITZ.